(12) United States Patent
Kihara

(10) Patent No.: US 7,922,403 B2
(45) Date of Patent: Apr. 12, 2011

(54) BLADE DRIVING APPARATUS FOR CAMERAS

(75) Inventor: Tomokazu Kihara, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 787 days.

(21) Appl. No.: 11/710,575

(22) Filed: Feb. 26, 2007

(65) Prior Publication Data

US 2007/0201866 A1  Aug. 30, 2007

(30) Foreign Application Priority Data

Feb. 28, 2006  (JP) .................................. 2006-052647

(51) Int. Cl.
*G03B 9/08* (2006.01)
(52) U.S. Cl. ...................................................... 396/463
(58) Field of Classification Search .................. 396/458, 396/463, 493, 497, 508
See application file for complete search history.

(56) References Cited

U.S. PATENT DOCUMENTS

| | | | | |
|---|---|---|---|---|
| 6,269,226 | B1 * | 7/2001 | Aoshima | 396/458 |
| 6,331,741 | B1 * | 12/2001 | Suzuki | 310/49.11 |
| 6,554,502 | B2 * | 4/2003 | Naganuma | 396/454 |
| 6,796,729 | B2 * | 9/2004 | Mizukami et al. | 396/497 |
| 2002/0197077 | A1 | 12/2002 | Eguro | |
| 2004/0062542 | A1 * | 4/2004 | Watanabe | 396/463 |
| 2004/0126106 | A1 * | 7/2004 | Horiike | 396/463 |
| 2005/0286889 | A1 | 12/2005 | Kihara | |
| 2007/0077061 | A1 * | 4/2007 | Watanabe et al. | 396/493 |
| 2007/0172231 | A1 * | 7/2007 | Durfee | 396/463 |
| 2007/0201866 | A1 * | 8/2007 | Kihara | 396/468 |

FOREIGN PATENT DOCUMENTS

| | | |
|---|---|---|
| JP | 2001-188275 | 7/2001 |
| JP | 2002-139765 | 5/2002 |
| JP | 2005-156616 | 6/2005 |

* cited by examiner

*Primary Examiner* — W. B. Perkey
(74) *Attorney, Agent, or Firm* — Sterne, Kessler, Goldstein & Fox P.L.L.C.

(57) ABSTRACT

A blade driving apparatus for cameras includes a base plate having an aperture section for a photographing optical path; a partition plate having an aperture section for the photographing optical path so that a blade chamber is interposed between the base plate and the partition plate; a cover frame having an actuator chamber between the partition plate and the cover frame; a permanent magnet rotor rotatably mounted on the cover frame so that an output pin is introduced into the blade chamber; a yoke in which tops of two legs constructed as magnetic pole sections are opposite to the peripheral surface of the rotor in the actuator chamber and one of the two legs is fitted into a bobbin around which a coil is wound; and at least one blade rotatably mounted to a shank for at least one blade which is set upright on the cover frame and is introduced into the blade chamber, and introduced into, and removed from, the exposure aperture by the output pin.

13 Claims, 11 Drawing Sheets

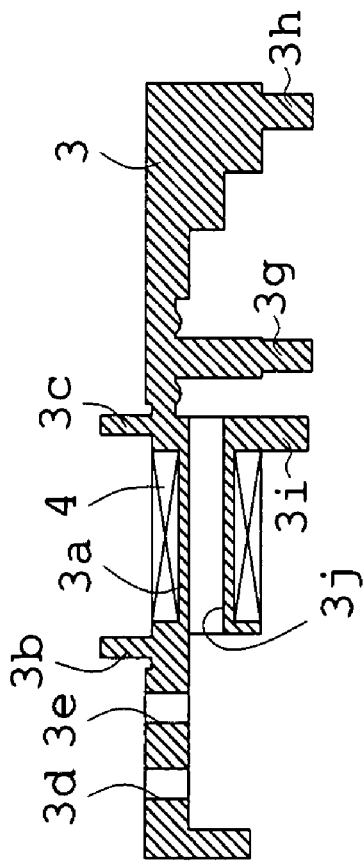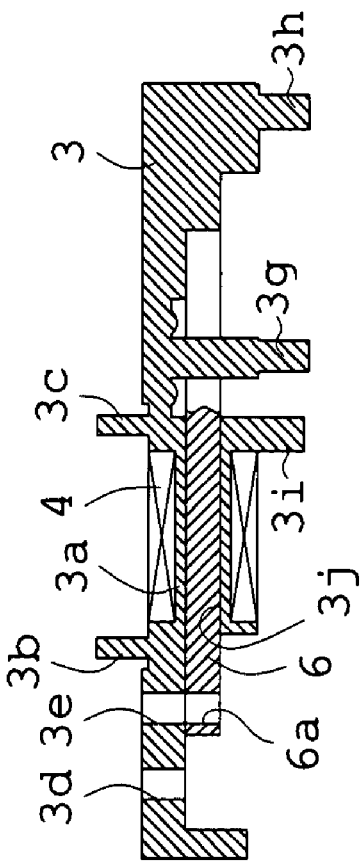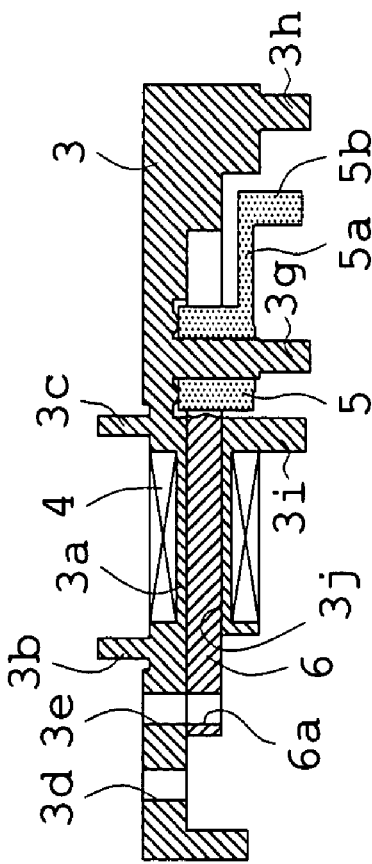
FIG. 2A
FIG. 2B
FIG. 2C

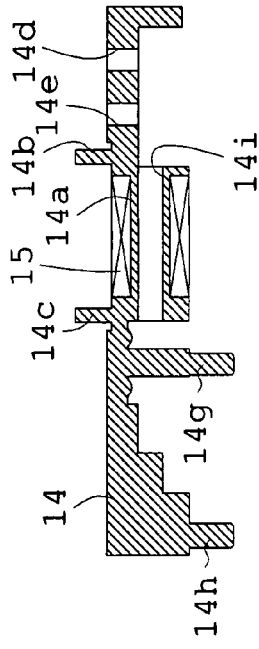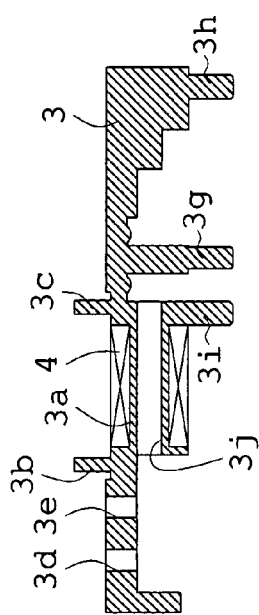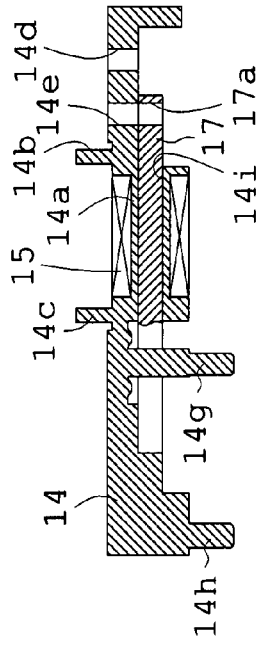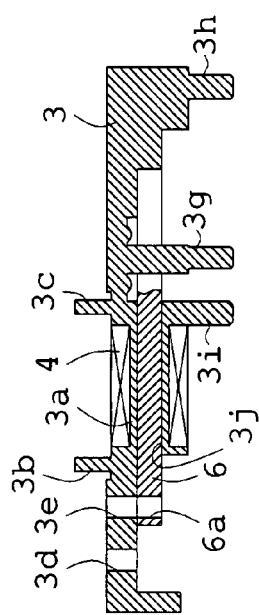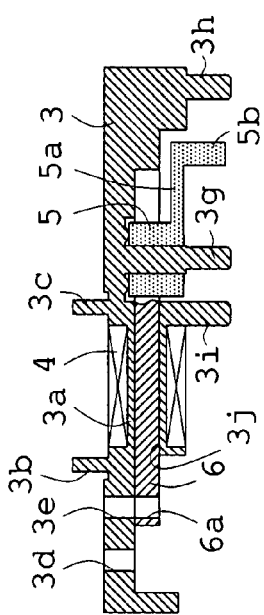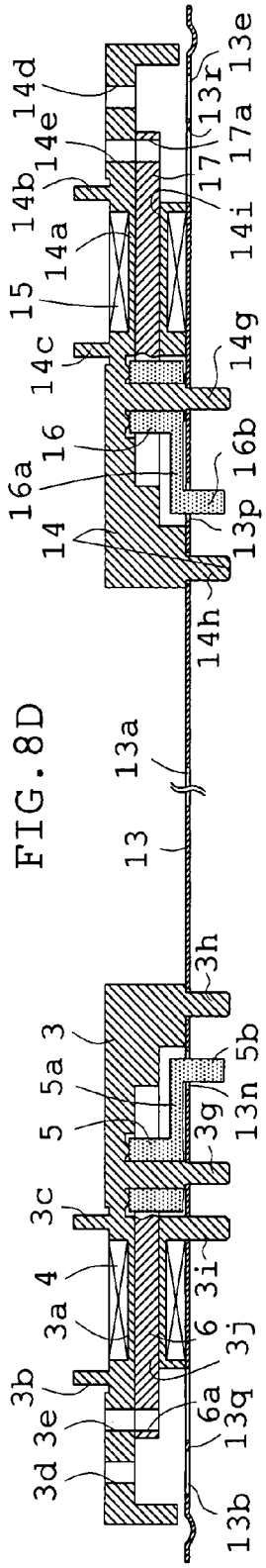

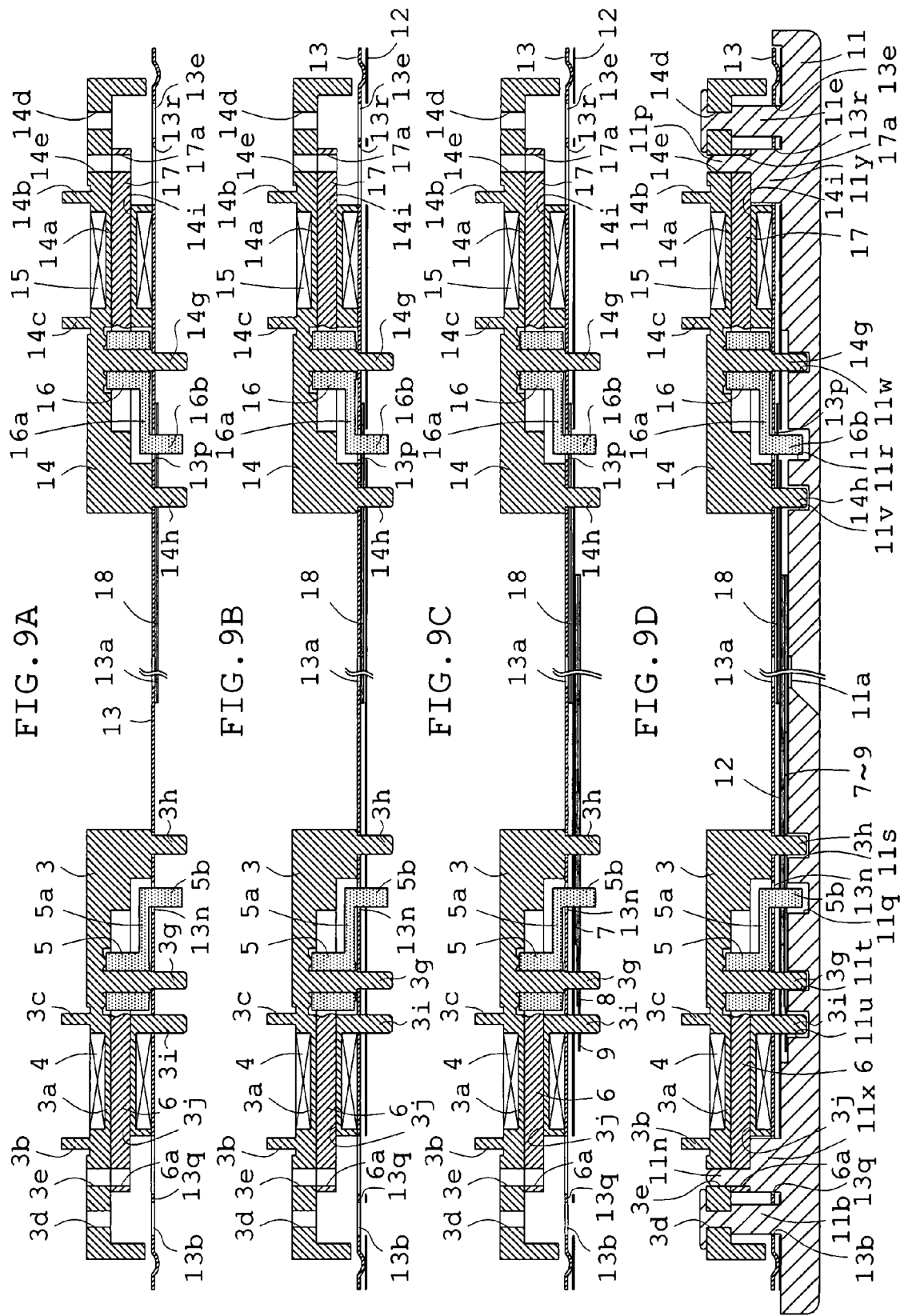

BLADE DRIVING APPARATUS FOR CAMERAS

BACKGROUND OF THE INVENTION

1. Field of the Invention

This invention relates to a blade driving apparatus for cameras designed so that blades, such as shutter blades or stop blades, are driven by an electromagnetic actuator.

2. Description of Related Art

Each of lens shutter apparatuses (hereinafter referred to as shutter apparatuses), stop apparatuses, filter apparatuses, and lens barrier apparatuses which are used in recent cameras has a single blade or a plurality of blades so that they are reciprocated by an electromagnetic actuator. As is well known, each of these apparatuses may be unified by itself, but two or three of them may be constructed as one unit.

The shutter apparatuses are generally designed so that two shutter blades are reciprocated and rotated simultaneously in opposite directions. However, some of the shutter apparatuses may be constructed so that a single shutter blade is reciprocated and rotated. It is also known that at least one of the two shutter blades reciprocated and rotated simultaneously in opposite directions is constructed with two divided blade components so that when the shutter is fully opened, these blade components are completely superimposed, and thereby less space for incorporating the shutters is required and compactness of the apparatus is achieved. It is further known that the shutter apparatus designed as mentioned above can be constructed as a lens barrier apparatus by arranging the blades in front of a photographic lens.

In the stop apparatuses, it is common practice to use a stop ring so as to reciprocate and rotate a plurality of stop blades simultaneously in the same direction. However, in recent small-sized digital cameras including cameras for incorporating information terminals such as mobile phones and PDAs (personal digital assistants), it is general practice to reciprocate and rotate a single stop blade that has a small circular aperture section. In recent filter apparatuses, it is common practice to cover the aperture section configured in the above single stop blade with an ND filter plate as a filter blade.

For the electromagnetic actuator, a step motor may be used, but when the apparatus is small in size, it is standard practice to use a current-controlled electromagnetic actuator. This electromagnetic actuator is such that a rotor made with a permanent magnet is turned in a direction according to the conductive direction of a stator coil and the blades are reciprocated by its output pin. The electromagnetic actuators used at present are roughly divided into two types, depending on the structure of the stator. The first type electromagnetic actuator is such that the stator coil is wound around a stator frame incorporating the rotor so as to surround two bearing portions of the rotor. The second type electromagnetic actuator is such that the stator coil is wound around a nearly U-shaped yoke. The second type electromagnetic actuator is suitable for the slim design of the entire apparatus.

Although the present invention relates to a blade driving apparatus for cameras adopting the second type electromagnetic actuator, of the current-controlled electromagnetic actuators mentioned above, Japanese Patent Kokai No. 2005-156616 discloses an apparatus in which the electromagnetic actuator of the above structure is adopted and the shutter apparatus and the stop apparatus are constructed as one unit.

However, the blade driving apparatus set forth in Kokai No. 2005-156616 has the following structure (words in parenthesis described below are names and reference numerals of members used in Kokai No. 2005-156616). A blade chamber is provided between a base plate (a base plate 1) and a partition plate (a partition plate 6) made with a thin material, and cover frames (bobbin members 7 and 12) are mounted to the base plate (the base plate 1) at the side position of an exposure aperture so that the partition plate (the partition plate 6) is interposed between the base plate and the cover frames. Although yokes (yokes 9, 10, 14, and 15) are interposed between the partition plate (the partition plate 6) and the cover frames (the bobbin members 7 and 12), permanent magnet rotors (permanent magnet rotors 2 and 3) are interposed between the base plate (the base plate 1) and the cover frames (the bobbin members 7 and 12). Such an arrangement is advantageous for the compact and slim design of the blade driving apparatus, and thus is extremely favorable for use not only in a single camera, but also in a camera incorporating an information terminal, such as a mobile phone or PDA, or an in-vehicle camera.

However, this arrangement, although favorable for the slim design of the apparatus, is not necessarily be favorable in the case where the area of the base plate (the base plate 1) is reduced to achieve compactness of the apparatus. This is because the permanent magnet rotors (the permanent magnet rotors 2 and 3) are interposed between the base plate (the base plate 1) and the cover frames (the bobbin members 7 and 12) and hence when an attempt is made to reduce the area of the base plate (the base plate 1), blades (a stop blade 4 and a shutter blade 5) must be prevented from interfering with the permanent magnet rotors (the permanent magnet rotors 2 and 3) during operation and there is the need to consider the mounting positions and shapes of the blades (the stop blade 4 and the shutter blade 5), causing the problem that the design becomes complicated. In particular, when three or more blades are used and an attempt is made to further reduce the housing area of the blades in a fully opened state, the above problem becomes severe.

SUMMARY OF THE INVENTION

It is, therefore, an object of the present invention to provide a blade driving apparatus for cameras, suitable for a slim and compact design, in which the number of degrees of design freedom is increased with respect to the mounting positions and shapes of blades, not to speak of the shape of a base plate, by properly interposing a permanent magnet rotor between a cover frame and a thin partition plate.

In order to accomplish the above object, the blade driving apparatus for cameras of the present invention comprises a base plate having an aperture section for a photographing optical path; a partition plate having an aperture section for the photographing optical path so that an exposure aperture is restricted by at least one of the aperture sections of the base plate and the partition plate, mounted to one surface of the base plate so that a blade chamber is interposed between the base plate and the partition plate; a cover frame mounted to the base plate at the side position area of the exposure aperture so that the partition plate is interposed between the base plate and the cover frame, having an actuator chamber between the partition plate and the cover frame; a permanent magnet rotor placed in the actuator chamber and rotatably mounted to a shank for the rotor that is set upright on the cover frame so that an output pin integrally rotated is introduced into the blade chamber; a yoke shaped like a letter "U" in which tops of two legs constructed as magnetic pole sections are opposite to the peripheral surface of the rotor in the actuator chamber and one of the two legs is fitted into a bobbin around which a coil is wound; and at least one blade placed in the blade chamber, rotatably mounted to a shank for at least one blade which is set upright on the cover frame and is introduced into the blade chamber, and introduced into, and removed from, the exposure aperture by the output pin.

In the case, when the apparatus is constructed so that the top of the shank for the rotor is introduced into the blade chamber and the shank for the rotor is also used as a shank for the blade, the design where a plurality of blades are provided is facilitated to offer an advantage to compactness of the apparatus. In addition, when the apparatus is constructed so that the bobbin is molded integrally with the cover frame or the cover frame has a notch and a part of the bobbin and a part of the coil are placed in this notch, this is advantageous for the slim design of the apparatus.

Further, in order to accomplish the above object, the blade driving apparatus for cameras of the present invention comprises a base plate having an aperture section for a photographing optical path; a partition plate having an aperture section for the photographing optical path so that an exposure aperture is restricted by at least one of the aperture sections of the base plate and the partition plate, mounted to one surface of the base plate so that a blade chamber is interposed between the base plate and the partition plate; first and second cover frames each mounted to the base plate at the side area of the exposure aperture so that the partition plate is interposed between the base plate and the cover frame, having first and second actuator chambers between the partition plate and the cover frames; first and second permanent magnet rotors separately placed in the first and second actuator chambers and rotatably mounted to shanks for rotors that are set upright on the first and second cover frames, respectively, so that output pins, each integrally rotated, are introduced into the blade chamber; first and second yokes each shaped like a letter "U" in which tops of two legs of each yoke constructed as magnetic pole sections are opposite to the peripheral surface of each of the first and second permanent magnet rotors and one of the two legs of each yoke is fitted into a bobbin around which a coil is wound; first and second shanks for blades set upright on the first and second cover frames, at least one for each of the cover frames; and first and second blades, each including at least one, rotatably mounted to the first and second shanks for the blades, respectively, in the blade chamber and introduced into, and removed from, the exposure aperture by individual output pins of the first and second permanent magnet rotors.

In this case, when the apparatus is constructed so that at least one of the shanks of the two rotors is constructed so that its top is introduced into the blade chamber, and is also used as one of the shanks for the two blades, the design where a plurality of blades are provided is facilitated to offer an advantage to compactness of the apparatus. In addition, when the apparatus is constructed so that at least one of the two bobbins is molded integrally with the cover frame or at least one of the two cover frames has a notch and a part of one of the two bobbins and a part of the coil wound around this bobbin are placed in the notch, this is advantageous for the slim design of the apparatus. The blade driving apparatus for cameras of the present invention, in which the compact and slim design is possible, is favorably applied to a camera incorporated in each of various installations as the apparatus controlling the amount of light of a solid-state image sensor. Therefore, the information terminal, such as the mobile phone or PDA, and the in-vehicle camera, incorporating the apparatus, come into the category of the present invention.

In the blade driving apparatus for cameras of the present invention, the permanent magnet rotor, the partition plate, and the blades, after being assembled in turn with respect to the shanks set upright on the cover frame, can be mounted to the base plate, and thus assembly work is favorably performed. Furthermore, since the permanent magnet rotor is supported by the cover frame and the thin partition plate, the number of degrees of design freedom is increased with respect to the mounting position and shape of the blade even when the base plate is reduced in size. When it is desired that the number of blades is increased and the base plate is reduced, this is particularly advantageous.

These and other features and advantages of the present invention will become apparent from the following detailed description of the preferred embodiments when taken in conjunction with the accompanying drawings.

BRIEF DESCRIPTION OF THE DRAWINGS

FIGS. 2A, 2B, and 2C are sectional views for explaining the assembly process of Embodiment 1, showing the cover frame around which the coil is wound, a state where the yoke is incorporated in the cover frame, and a state where the permanent magnet rotor is incorporated in the cover frame, respectively;

FIGS. 8A, 8B, 8C, and 8D are sectional views for explaining the assembly process of Embodiment 2, showing two cover frames around which coils are wound, a state where individual yokes are incorporated in the two cover frames, a state where individual permanent magnet rotors are incorporated in the two cover frames, and a state where the partition plate is incorporated in the two cover frames, respectively;

FIGS. 9A, 9B, 9C, and 9D are sectional views for explaining the assembly process subsequent to FIG. 8D, showing a state where one stop blade is incorporated in one cover frame, a state where an intermediate plate is incorporated in two cover frames, a state where three shutter blades are incorporated in the other cover frame, and the two cover frames are finally mounted to the bade plate, respectively;

DETAILED DESCRIPTION OF THE PREFERRED EMBODIMENTS

Figure 1:
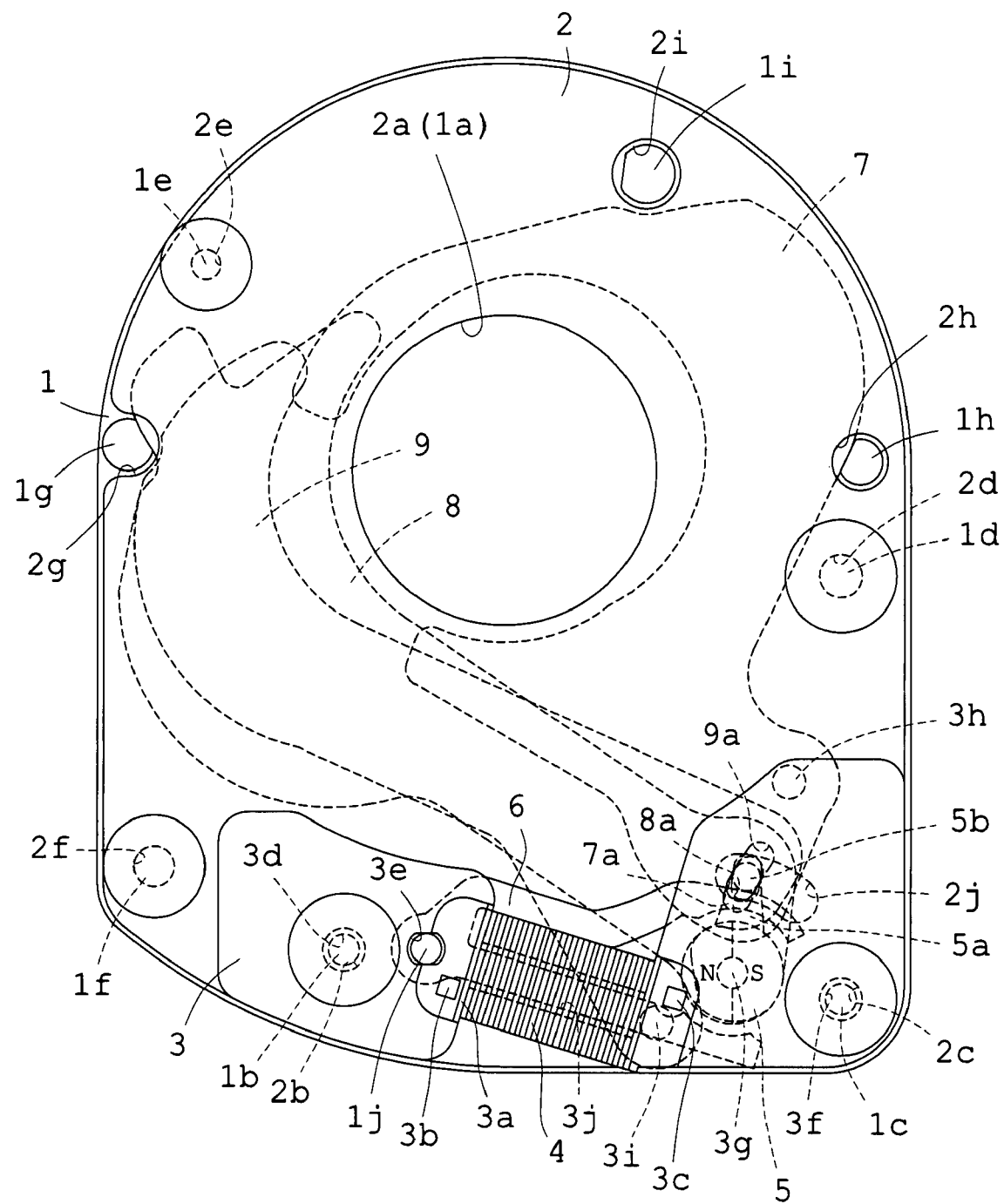
FIG. 1 is a plan view showing a state of Embodiment 1 brought about immediately before photography.

In accordance with two embodiments shown in the drawings, the present invention will be explained below. It is possible that the present invention is applied to all compact cameras, for example, various digital cameras and silver-halide film cameras. As mentioned above, each of the shutter apparatus, the stop apparatus, and the filter apparatus may be constructed as an independent unit and a plurality of them may also be constructed as one unit. The two embodiments are designed so that both of them can be applied to cameras of information terminals such as mobile phones. In Embodiment 1, only the shutter apparatus is constructed as a unit, while in Embodiment 2, the shutter apparatus and the stop apparatus are constructed as one unit. Also, FIGS. 1 to 5A-5C illustrate Embodiment 1 and FIGS. 7 to 11 illustrate Embodiment 2.

Embodiment 1

With reference to FIGS. 1 to 5A-5C, Embodiment 1 will be described. The structure of this embodiment is first explained, mainly using FIGS. 1 and 3A-3C. A base plate 1 of the embodiment, made of synthetic resin, is a relatively thick member and has a circular aperture section 1a for a photographing optical path. In the base plate 1, five mounting shanks 1b, 1c, 1d, 1e, and 1f, three stopper pins 1g, 1h, and 1i, and a positioning pin 1j are set upright on one surface by integral molding, and as shown in FIG. 3C, a non-through slot 1k and three non-through holes 1m, 1n, and 1p are provided. At the position where the positioning pin 1j is set upright, a large thickness portion 1q (see FIG. 3C) is configured. In contrast to this, a remaining surface has a flat shape free from projections.

A partition plate 2 is configured into an extremely thin plate shape so that a blade chamber is provided between the base plate 1 and the partition plate 2, and has a circular aperture section 2a for the photographing optical path at the position where it is superimposed with the aperture section 1a of the base plate 1. In the embodiment, the aperture section 1a is nearly the same in diameter as the aperture section 2a so that the exposure aperture is restricted by both the aperture sections. However, the exposure aperture may be restricted by making one of the aperture sections smaller, and in practice the exposure aperture is frequently restricted by the aperture section 2a. The partition plate 2 is provided with holes 2b, 2c, 2d, 2e, and 2f into which the mounting shanks 1b, 1c, 1d, 1e, and 1f are fitted; a notch 2g for avoiding contact with the top of the stopper pin 1g; holes 2h and 2i into which the tops of the stopper pins 1h and 1i are fitted; and a relatively large hole 2k into which the large thickness portion 1q is fitted. In addition, at a position corresponding to the slot 1k, a slot 2j of nearly the same shape is configured, and at positions corresponding to the holes 1m, 1n, and 1p, three holes (no reference number) of similar shapes are also configured.

A cover frame 3, made of synthetic resin, has a complicated shape and is such that an actuator chamber is provided between the partition plate 2 and the cover frame 3 at the side area of the exposure aperture (by the aperture sections 1a and 2a). At about the middle of the longitudinal distance of the cover frame 3, a bobbin 3a having a hollow 3j is provided, around which a coil 4 is wound so that both ends of the coil 4 are wound on pins 3b and 3c set upright on surfaces outside the actuator chamber. The cover frame 3 is provided with three holes 3d, 3e, and 3f. As will be seen from the mounting shank 1b illustrated in FIG. 3C, each of the two mounting shanks 1b and 1c includes two shank portions of different diameters, and small-diameter shank portions configured on the top sides of the mounting shanks 1b and 1c are fitted into the holes 3d and 3f. The positioning pin 1j is loosely fitted into the hole 3e. On the partition-plate-2 side of the cover frame 3, three shanks 3g, 3h, and 3i are set upright. Of these shanks, the shank 3g, as seen from FIG. 3C, includes two shank portions of different diameters so that a top-side small-diameter shank portion passes through a hole (no reference number) provided in the partition plate 2 and its top is inserted in the hole 1n of the base plate 1. The shanks 3h and 3i pass through individual holes (each having no reference number) provided in the partition plate 2 and their tops are inserted in the holes 1m and 1p, respectively, of the base plate 1.

The permanent magnet rotor 5 is placed in the actuator chamber and is rotatably mounted to a large-diameter shank portion of the shank 3g. The permanent magnet rotor 5 is molded by mixing a magnetized material with a synthetic resin material and has an output pin 5b so as to become parallel with the shank 3g at the top of an arm 5a that projects radially. The output pin 5b passes through the slot 2j of the partition plate 2 and its top is inserted in the slot 1k of the base plate 1. As is well known, the cylindrical portion of the permanent magnet rotor 5 of the embodiment is magnetized to have two poles radially. The permanent magnet rotor 5 of the embodiment is constructed as mentioned above, but as is well known (for example, see Japanese Patent Kokai No. 2005-241866), a rotor in which only the cylindrical portion is made with the permanent magnet, and the arm 5a and the output pin 5b is integrally molded out of synthetic resin is also known. The rotor constructed in this way is also placed in the same category as the permanent magnet rotor of the present invention.

The yoke 6 of the embodiment is shaped like the letter "U" so that the tops of two legs are constructed as magnetic pole sections and are opposite to the peripheral surface of the permanent magnet rotor 5 in such a manner that it is interposed between them and one of the legs is inserted in a hollow 3j provided at the center of the bobbin 3a. The yoke 6 is provided with a hole 6a, into which the positioning pin 1j is fitted.

In the case of the embodiment, three shutter blades 7, 8, and 9 are arranged in the blade chamber. The shutter blade 7 located at the most partition-plate-2-side position is rotatably mounted to the shank 3h so that the output pin 5b is fitted into a slot 7a of the shutter blade 7. The shutter blade 8 placed at the middle is rotatably mounted to the shank 3g so that the output pin 5b is fitted into a slot 8a of the shutter blade 8. The shutter blade 9 located at the most base-plate-1-side position is rotatably mounted to the shank 3i so that the output pin 5b is fitted into a slot 9a of the shutter blade 9.

Here, the assembly procedure of the shutter apparatus constructed as mentioned above will be described, chiefly using FIGS. 2A-2C and 3A-3C. In FIG. 2A, the cover frame 3 on which the coil 4 is already wound is shown. In the embodiment, this cover frame 3 on which the coil 4 is wound is turned upside down and placed on a special jig, and other components are set in succession from the upper side (the lower side of FIG. 2A). The yoke 6 is first set. In this case, one leg of the yoke 6 is inserted in the hollow 3j provided in the bobbin 3a, and the hole 6a of the yoke 6 is made to coincide with the hole 3e of the cover frame 3. This situation is illustrated in FIG. 2B. Also, in FIGS. 2A-2C and 3A-3C, the top of the leg (the magnetic pole section) inserted in the hollow of the bobbin 3a is eliminated to show the yoke 6.

Figure 3A:
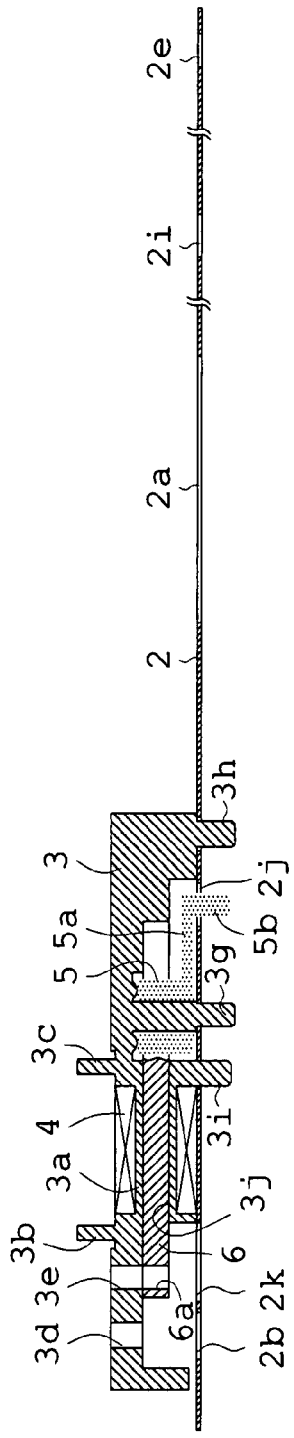
FIGS. 3A, 3B, and 3C are sectional views for explaining the assembly process subsequent to FIG. 2C, showing a state where the partition plate is incorporated in the cover frame, a state where the shutter blades are incorporated in the cover frame, and a state where the cover frame is finally mounted to the base plate, respectively.
Figure 3B:
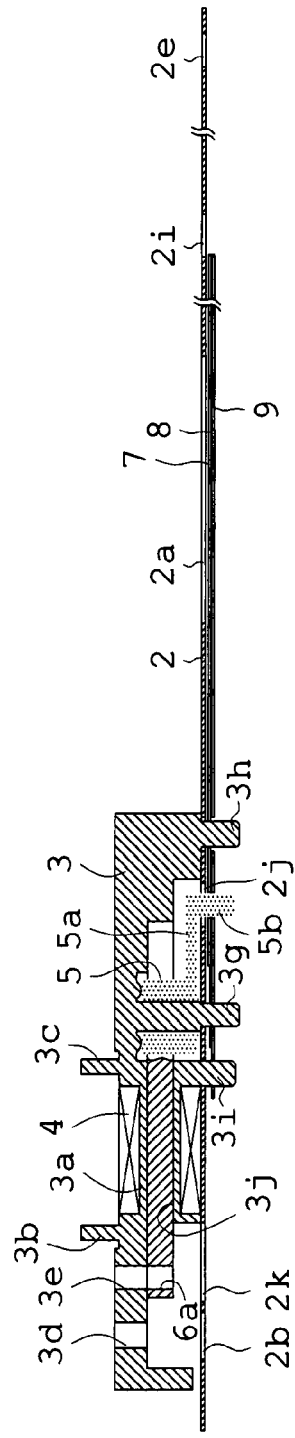

Subsequently, as shown in FIG. 2C, the permanent magnet rotor 5 is set to the shank 3g of the cover frame 3. After that, as shown in FIG. 3A, three holes provided in the partition plate 2, each having no reference number, are set to the shanks 3g, 3h, and 3i, and the slot 2j is set to the output pin 5b. In this case, since a hole (no reference number) provided in the partition plate 2 to be set to the shank 3g has the diameter of size such that only the small-diameter shank portion of the shank 3g can be fitted, the partition plate 2 abuts on the shoulder of the shank 3g and serves to prevent the permanent magnet rotor 5 from slipping off. After that, when holes provided in the three shutter blades 7, 8, and 9, each having no reference number, are set in turn to the shanks 3h, 3g, and 3i, and the slots 7a, 8a, and 9a are set to the output pin 5b, a situation shown in FIG. 3B is brought about.

After the shutter blades 7, 8, and 9 are assembled in this way, the partition plate 2 and the cover frame 3 are finally mounted to the base plate 1. In this case, the large thickness portion 1q of the base plate 1 is fitted into a hole 2k provided in the partition plate 2, the positioning pin 1j is fitted into the hole 6a of the yoke 6 and the hole 3e of the cover frame 3, and the stopper pins 1h and 1i are fitted into the holes 2h and 2i, respectively, of the partition plate 2. At the same time, the small-diameter shank portions provided on the top sides of the mounting shanks 1b and 1c are fitted into the holes 3d and 3f of the cover frame 3, and the mounting shanks 1d, 1e, and 1f are fitted into the holes 2d, 2e, and 2f, respectively, of the partition plate 2. Whereby, the tops of the shanks 3g, 3h, and 3i of the cover frame 3 are inserted in the non-through holes 1n, 1m, and 1p, respectively, provided in the base plate 1, and the top of the output pin 5b is inserted in the non-through slot 1k provided in the base plate 1.

Figure 3C:
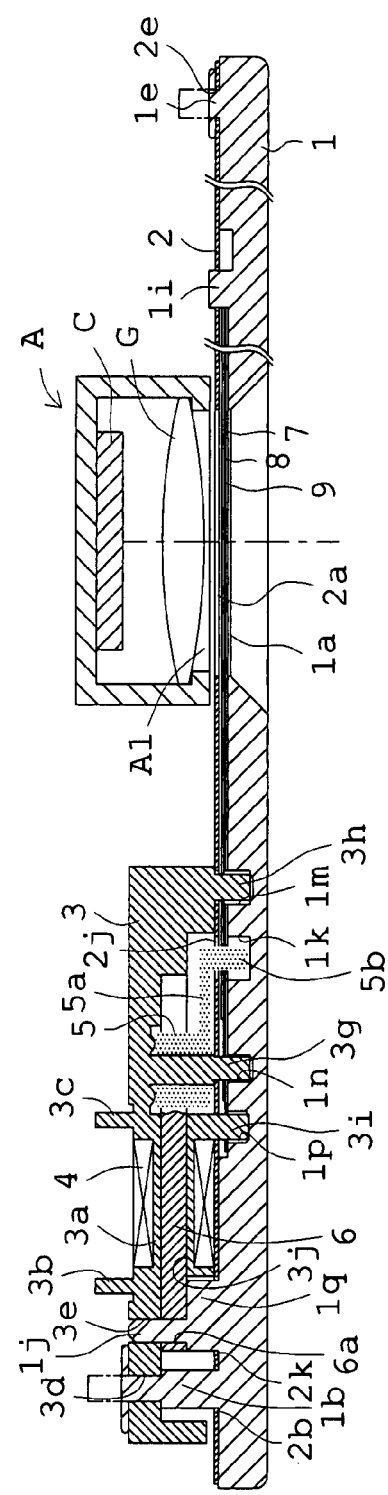

When the mounting shanks 1b and 1c are fitted into the holes 3d and 3f, respectively, of the cover frame 3 as mentioned above, the mounting shanks 1d and 1c are in a state where their tops pass through, and protrude from, the holes 3d and 3f. When the mounting shanks 1d, 1e, and 1f are fitted into the holes 2d, 2e, and 2f, respectively, of the partition plate 2, the mounting shanks 1d, 1e, and 1f are in a state where their tops also pass through, and protrude from, the holes 2d, 2e, and 2f. In FIG. 3C, the top contours of the mounting shanks 1b and 1e in this case are indicated by chain lines. In this state, the embodiment is such that the tops of the mounting shanks 1b, 1c, 1d, 1e, and 1f are fused by heat and are deformed like flanges. Whereby, the partition plate 2 and the cover frame 3 are mounted to the base plate 1. FIG. 3C illustrates the shutter apparatus assembled in this way.

In FIG. 3C, an imaging module A incorporated in the camera is shown together with the shutter apparatus of the embodiment. This imaging module A is provided with a photographic lens G and a solid-state image sensor C in its interior and has an aperture section A1 located close to the partition plate 2. In the embodiment, the imaging module A is placed behind the shutter apparatus. However, it is needless to say that the shutter apparatus of the embodiment may be interposed between the solid-state image sensor C and the photographic lens G. The same holds for the case of the blade driving apparatus of Embodiment 2 to be described later.

Figure 5B:
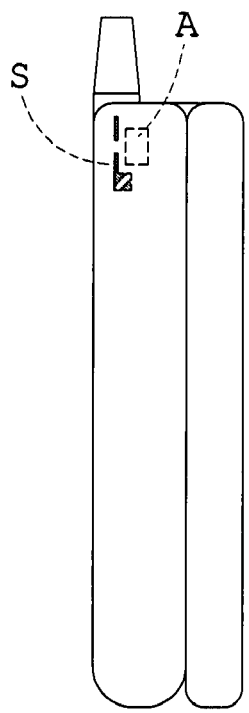
FIGS. 5A, 5B, and 5C are views of an example of a mobile phone incorporating the shutter apparatus of Embodiment 1, showing a front view of the phone that is not used, a left side view of the phone of FIG. 5A, and a front view of the phone that is used, respectively.
Figure 5A:
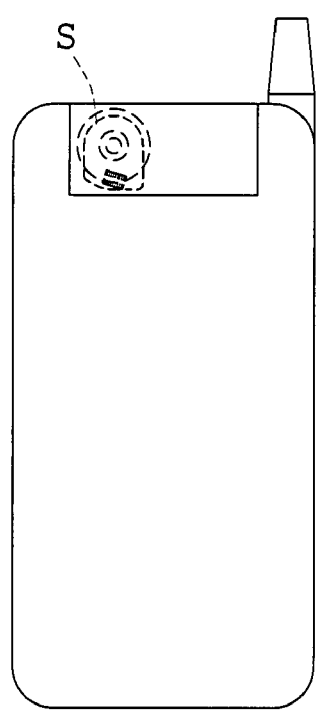
Figure 5C:
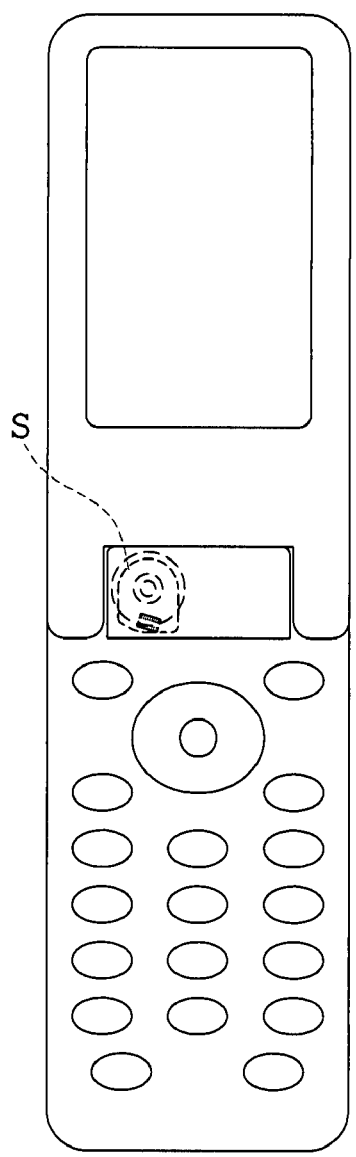

As mentioned above, the shutter apparatus of the embodiment has the structure suitable for the compact and slim design. Thus, the shutter apparatus can be used in various cameras, and in particular, is has the structure that is easily used in a camera for a mobile phone. FIGS. 5A-5C show one example where the shutter apparatus of the embodiment, when used in the camera for the mobile phone, is placed in the mobile phone. FIG. 5A is a front view of the phone that is not used, FIG. 5B is a left side view of the phone of FIG. 5A, and FIG. 5C is a front view of the phone that is used. As seen from these figures, a shutter apparatus S of the embodiment can be placed at any position of the mobile phone according to the need.

Subsequently, the operation of Embodiment 1 will be described. FIG. 1 shows an initial state before photography (a photographing wait state). In this case, the shutter blades 7, 8, and 9 bring the exposure aperture (by the aperture sections 1a and 2a) into a fully opened state to expose a solid-state image sensor C to light from an object to be photographed. In this initial state, therefore, a power source is already turned on and thus it becomes possible that a photographer observes an image of the object through a monitor. In this case, the coil 4 is not energized, but as is well known, a magnetic attractive force is exerted between the magnetic pole of the permanent magnet rotor 5 and the magnetic pole sections of the yoke 6 so that a force for counterclockwise rotation is imparted to the permanent magnet rotor 5. However, since the shutter blade 7 comes in contact with the stopper pin 1h and the shutter blade 8 also comes in contact with the stopper pin 1g, the permanent magnet rotor 5 cannot be rotated, and a stopped state shown in FIG. 1 is securely maintained.

Figure 4:
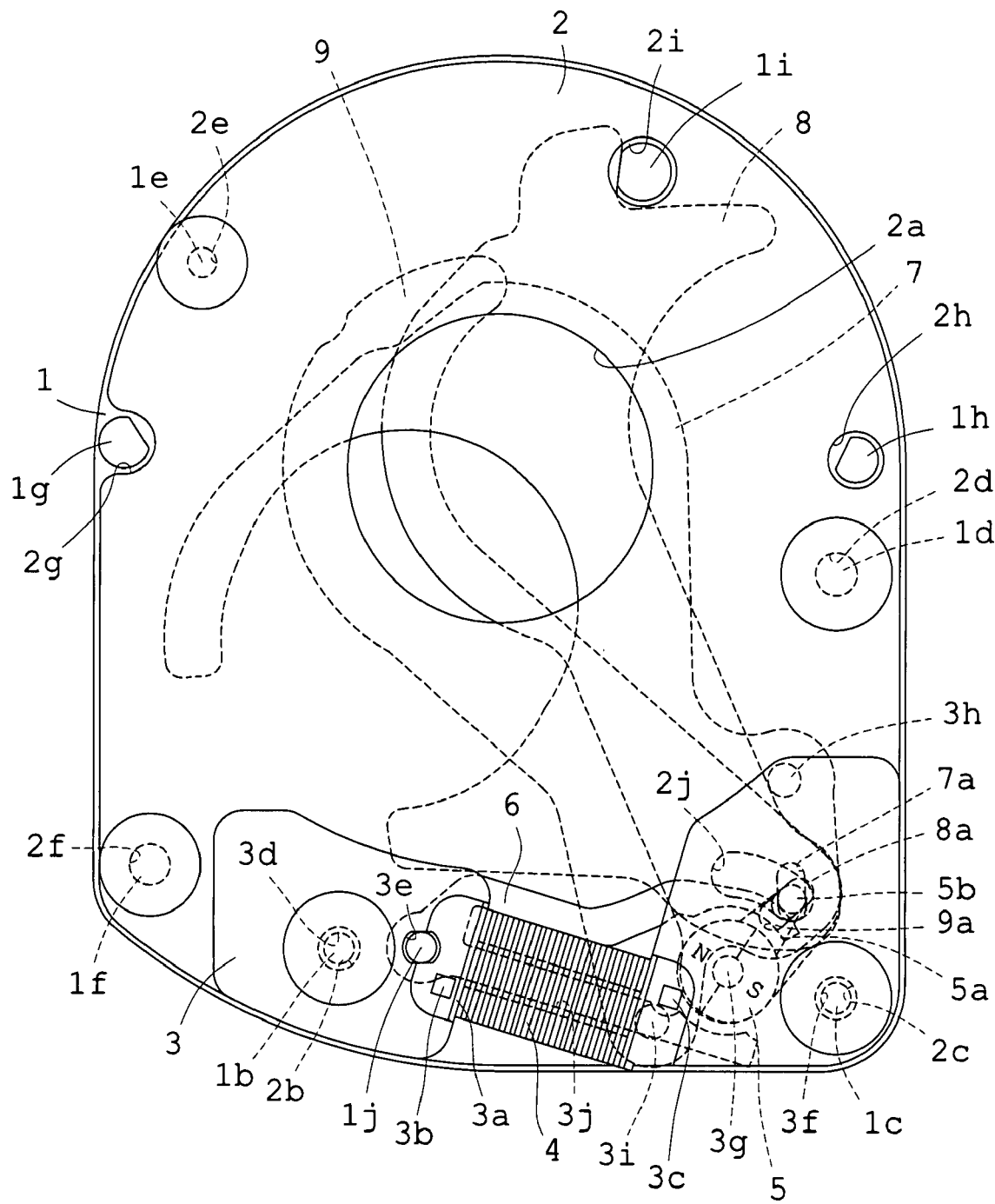
FIG. 4 is a plan view showing a state of Embodiment 1 brought about immediately after photography is completed.

When a release button of the camera is pushed in photography, electric charges stored in the solid-state image sensor are discharged by an electric signal from an exposure control circuit, and exposure for photography is started. When preset time passes, electric current is supplied to the coil 4 in a forward direction by the signal from the exposure control circuit. Consequently, the permanent magnet rotor 5 is turned in a clockwise direction, the shutter blade 7 is rotated in the counterclockwise direction by the output pin 5b, and the shutter blades 8 and 9 are rotated in the clockwise direction, thereby closing the aperture section 2a (the exposure aperture). In this case, however, since a distance from the output pin 5b to the shank 3g is shorter than that from the output pin 5b to the shank 3i, the shutter blade 8 is rotated faster than the shutter blade 9. When the shutter blades 7, 8, and 9 close the aperture section 2a, the shutter blade 8 abuts on the stopper pin 2i immediately after this, and thereby the rotation of each of the permanent magnet rotor 5 and the shutter blades 7, 8, and 9 is stopped. This state is shown in FIG. 4 and in this case, the amount of overlapping of the shutter blades 8 and 9 is kept to a minimum.

When the aperture section 2a is closed, imaging information is transferred to a memory device in this state. When this transfer is completed, the electric current, in contrast to the above case, is supplied to the coil 4 in a reverse direction. Consequently, the permanent magnet rotor 5 is turned in the counterclockwise direction, the shutter blade 7 is rotated in the clockwise direction by the output pin 5b, and the shutter blades 8 and 9 are rotated in the counterclockwise direction, thereby opening the exposure aperture. In this process, however, the amount of overlapping of the shutter blades 8 and 9 is increased. Immediately after the aperture section 2a is fully opened, the shutter blade 7 abuts on the stopper pin 1h and the shutter blade 8 abuts on the stopper pin 1g. Whereby, the rotation of each of the permanent magnet rotor 5 and the shutter blades 7, 8, and 9 is stopped. After that, when power to the coil 4 is disconnected, the shutter blades are restored to the initial position (the photographing wait state) shown in FIG. 1.

As mentioned above, the shutter blades 8 and 9 are rotated simultaneously in the same direction so that the amount of overlapping is changed during the operation. Now, consider the case where the shutter blades 8 and 9 in a state of FIG. 4 are constructed as a single shutter blade. When the exposure aperture is fully opened, a part of this single shutter blade projects from the blade chamber toward the left of FIG. 1 in its opening operation. As seen from this fact, in the embodiment, the shutter apparatus is constructed with three shutter blades, and thereby it becomes possible that the area of the base plate 1 is reduced to achieve compactness of the entire shutter apparatus.

In the shutter apparatus of the embodiment, however, not only is a compact design achieved by the structure of three shutter blades, but also a further compact design is attained by another reason. This is that, as seen from FIGS. 1 and 4, the shutter blades 7, 8, and 9 can be arranged in such a manner that a part of each of them overlaps the permanent magnet rotor 5. If the permanent magnet rotor 5 is interposed between the base plate 1 and the cover frame 3, the three shutter blades 7, 8, and 9 cannot be favorably arranged unless the base plate 1 is made larger than in the embodiment. If the shutter blades are arranged without enlarging the base plate 1, for example, the arm 5a of the permanent magnet rotor 5 must be elongated or the contours of the shutter blades 7, 8, and 9 must be configured into special shapes. As a result, the degree of freedom is considerably impaired and working becomes difficult. The same holds for the case where the shutter apparatus is constructed with a single shutter blade as described in Kokai No. 2005-156616, or where the shutter blades 8 and 9 in the embodiment are constructed as a single shutter blade and thereby the shutter apparatus is constructed with two shutter blades.

Since the present invention, as in the embodiment, is based on the premise that the blade chamber is provided between the partition plate 2 made with an extremely thin plate material and the base plate 1, shanks cannot be set upright on the partition plate 2. Therefore, the shanks 3g, 3h, and 3i for mounting the shutter blades 7, 8, and 9 formerly would have been set upright on the base plate 1. In this construction, however, when the cover frame 3 is mounted to the base plate 1 at the final stage of assembly work, complicated members are set to both the base plate 1 and the cover frame 3 and hence their setting work becomes very cumbersome. According to the structure of the present invention, however, since the cover frame 3 mounting all members other than the base plate 1 and the base plate 1 mounting nothing are mutually set, the setting work is extremely facilitated.

Also, although in the embodiment both the permanent magnet rotor 5 and the shutter blade 8 are mounted to the shank 3g set upright on the cover frame 3, the present invention may be designed so that the shutter blade 8 is mounted to an independent shank set upright on the cover frame 3. In this case, however, since the partition plate 2 is a thin plate member and serves to prevent the permanent magnet rotor 5 from slipping off, some consideration is required to avoid the possibility that the tip of the shank 3g projects into the blade chamber. In case of the projection into the blade chamber, it is necessary to prevent the shutter blades from colliding during the operation. As such, the structure of the embodiment is surpassed.

Figure 6:
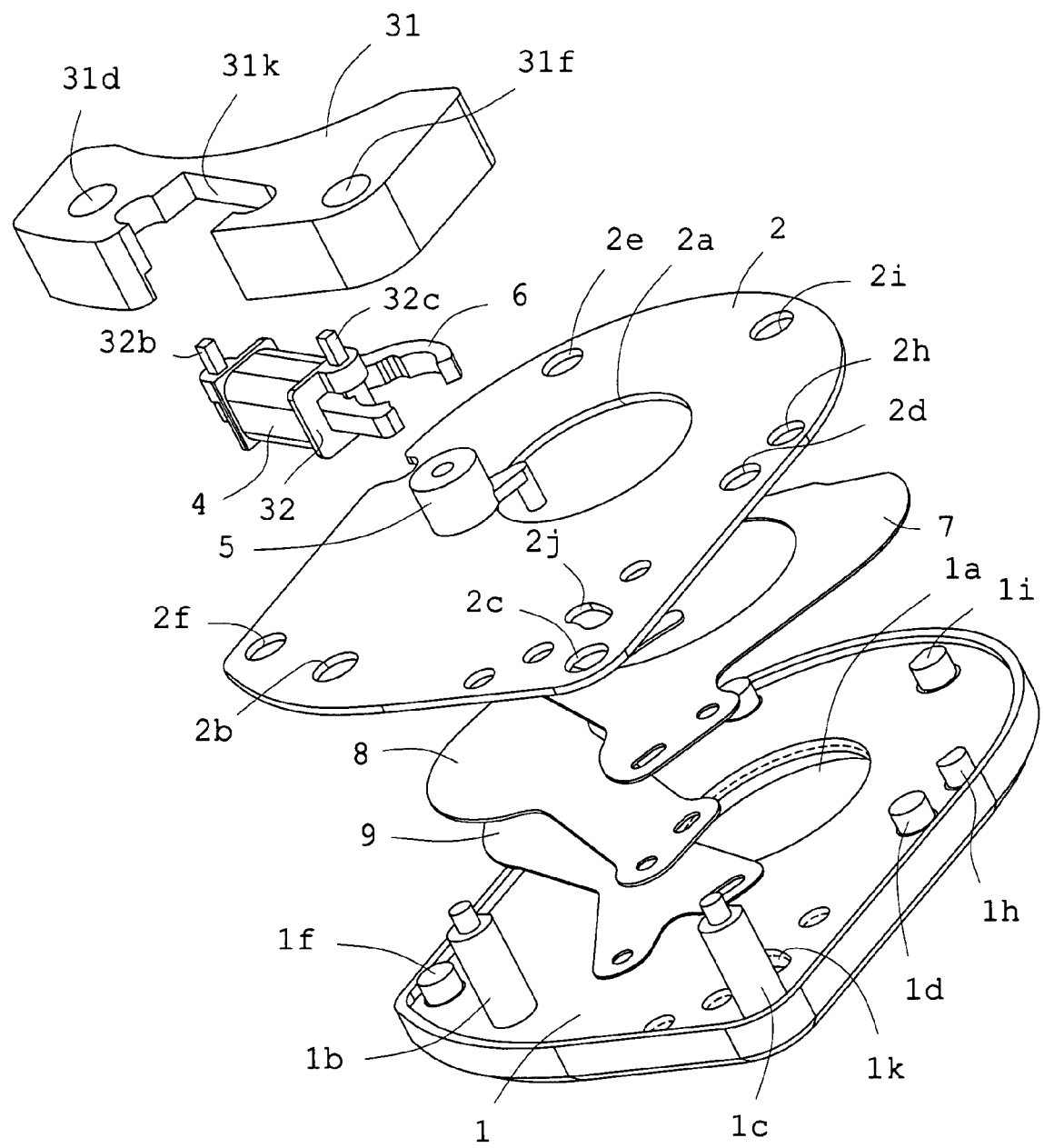
FIG. 6 is an exploded perspective view showing a modified example of Embodiment 1.

Also, although in the embodiment the cover frame 3 is provided with the bobbin 3a, the cover frame in the present invention is not limited to this structure, and the bobbin 3a may be constructed as a member independent of the cover frame 3. Such a structure is shown in FIG. 6 as a modified example. In this modified example, holes 31d and 31f corresponding to the hole 3d and 3f are provided in a cover frame 31 and in addition, a notch 31k is provided. A bobbin 32 around which the coil 4 is wound has pins 32b and 32c corresponding to the pins 3b and 3c. When the cover frame 31 is mounted to the base plate 1, a part of the bobbin 32 and a part of the coil 4 is such as to enter the notch 31k.

The above description of the operation is given of the case where the shutter apparatus of the embodiment is applied to a digital camera. However, when it is applied to a silver-halide film camera, a state shown in FIG. 4 corresponds to the initial state (the photographing wait state), and in photography, the shutter blades 7, 8, and 9, after being brought into the fully opened state shown in FIG. 1, are restored to a state shown in FIG. 4.

Although the embodiment is provided with three shutter blades, the present invention, as mentioned above, may have one or two shutter blades. It is possible that the shutter apparatus constructed in this way is adopted as a lens barrier apparatus, as it is. When a single shutter blade is applied so that the shutter blade is provided with a circular aperture section smaller than the exposure aperture, the shutter apparatus can be adopted as a stop apparatus. Further, when an ND filter plate is attached to this small aperture section, the shutter apparatus can also be adopted as a filter apparatus. As such, the present invention is applied to all of these apparatuses.

Embodiment 2

Subsequently, Embodiment 2 will be described in reference to FIGS. 7-11. In this embodiment, the shutter apparatus and the stop apparatus are constructed as one unit. The structure of the shutter apparatus is substantially the same as in Embodiment 1. Like reference numerals are thus used for the members of the shutter apparatus with respect to Embodiment 1, and their detailed description is omitted. However, the base plate and the partition plate of the embodiment are different from those of Embodiment 1. Hence, the description of the structure of the embodiment is mainly given of the base plate, the partition plate, and the stop apparatus.

Figure 10:
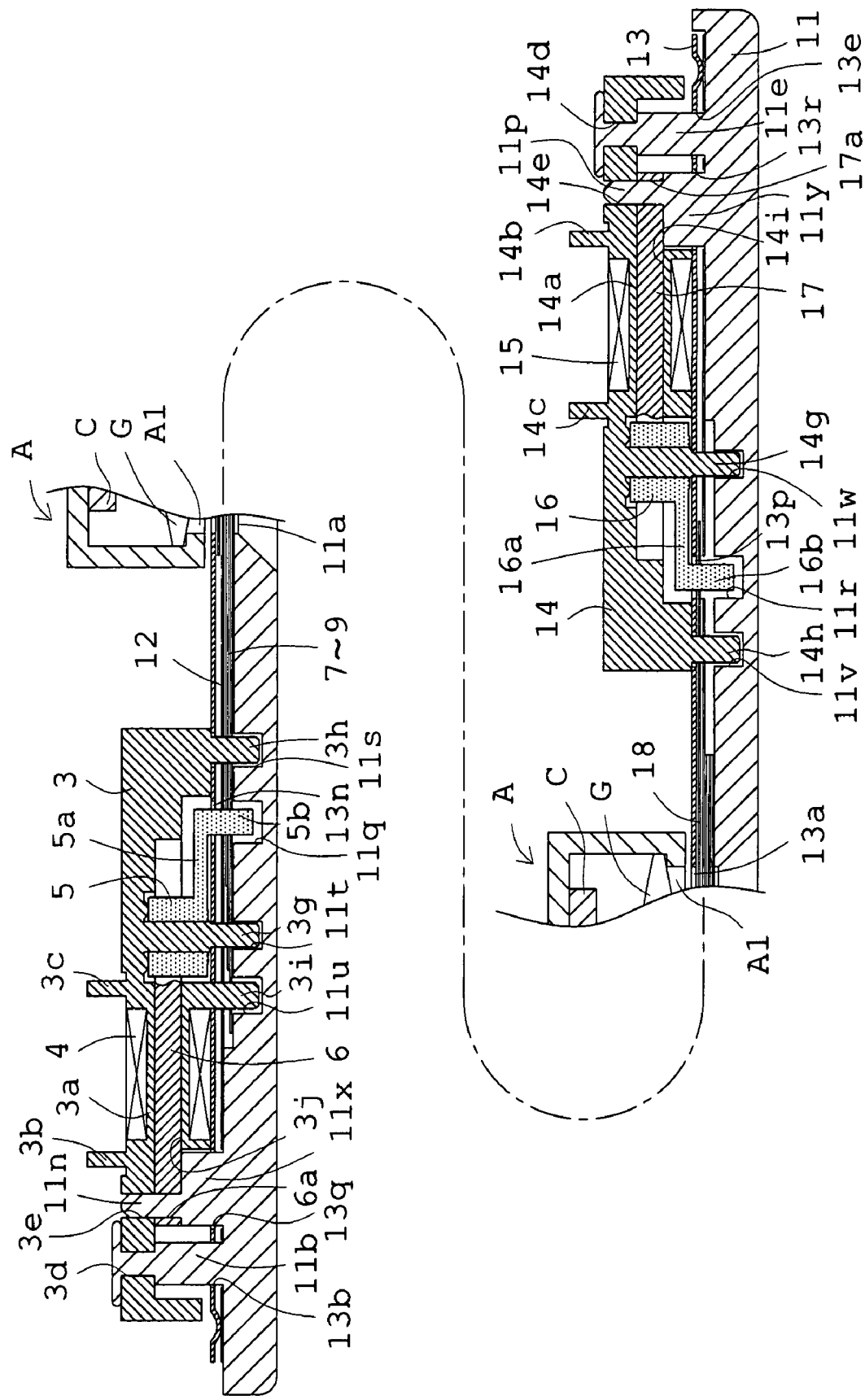
FIG. 10 is an enlarged sectional view showing the unit of FIG. 9D that is divided into two halves and enlarged.

A base plate 11 of the embodiment is made of synthetic resin and is provided with a circular aperture section 11a for a photographing optical path. In this base plate 11, six mounting shanks 11b, 11c, 11d, 11e, 11f, and 11g; five stopper pins 11h, 11i, 11j, 11k, and 11m; and two positioning pins 11n and 11p are set upright by integral molding on one surface. In addition, as shown in FIG. 10 enlarging the diagram of FIG. 9D, two non-through slots 11q and 11r and five non-through holes 11s, 11t, 11u, 11v, and 11w are provided. In regions in which the positioning pins 11n and 11p are set upright, large thickness portions 11x and 11y (see FIG. 10) are configured.

As shown in FIG. 10, an intermediate plate 12 and a partition plate 13 are arranged at the upper position of the base plate 11. A first blade chamber is provided between the base plate 11 and the intermediate plate 12, and a second blade chamber is provided between the intermediate plate 12 and the partition plate 13. The intermediate plate 12 is made with a thinner material than the partition plate 13. In FIG. 10, therefore, the section of the intermediate plate 12 cannot be clearly shown and is indicated by a thick line. The plane configuration of the intermediate plate 12, including positions and shapes of holes provided therein, is exactly the same as that of the partition plate 13 shown in FIG. 7. Thus, in the following, reference is made to only the plane configuration of the partition plate 13.

The partition plate 13 of the embodiment is provided with an aperture section 13a for a photographing optical path that has the same diameter as the aperture section 11a of the base plate 11 at a position where it overlaps an aperture section 11a. In the embodiment, therefore, the exposure aperture is restricted by three aperture sections: the aperture sections 11a and 13a and the aperture section of the intermediate plate 12. In the embodiment also, however, the diameter of the aperture 13a of the partition plate 13 may be made smaller than those of the other two aperture sections so that the exposure aperture is restricted by the aperture section 13a alone. The partition plate 13 is configured with holes 13b, 13c, 13d, 13e, 13f, and 13g into which mounting shanks 11b, 11c, 11d, 11e, 11f, and 11g, respectively, are fitted; a notch 13h for avoiding contact with the top of the stopper pin 11k; holes 13i, 13j, 13k, and 13m into which the stopper pins 11h, 11i, 11j, and 11m, respectively, are fitted; and two relatively large holes 13*q* and 13*r*. In addition, two slots 13*n* and 13*p* of nearly the same shape are provided at positions corresponding to the slots 11*q* and 11*r*, and five holes (each having no reference number) of nearly the same shape are provided at positions corresponding to the holes 11*s*, 11*t*, 11*u*, 11*v*, and 11*w*.

Figure 7:
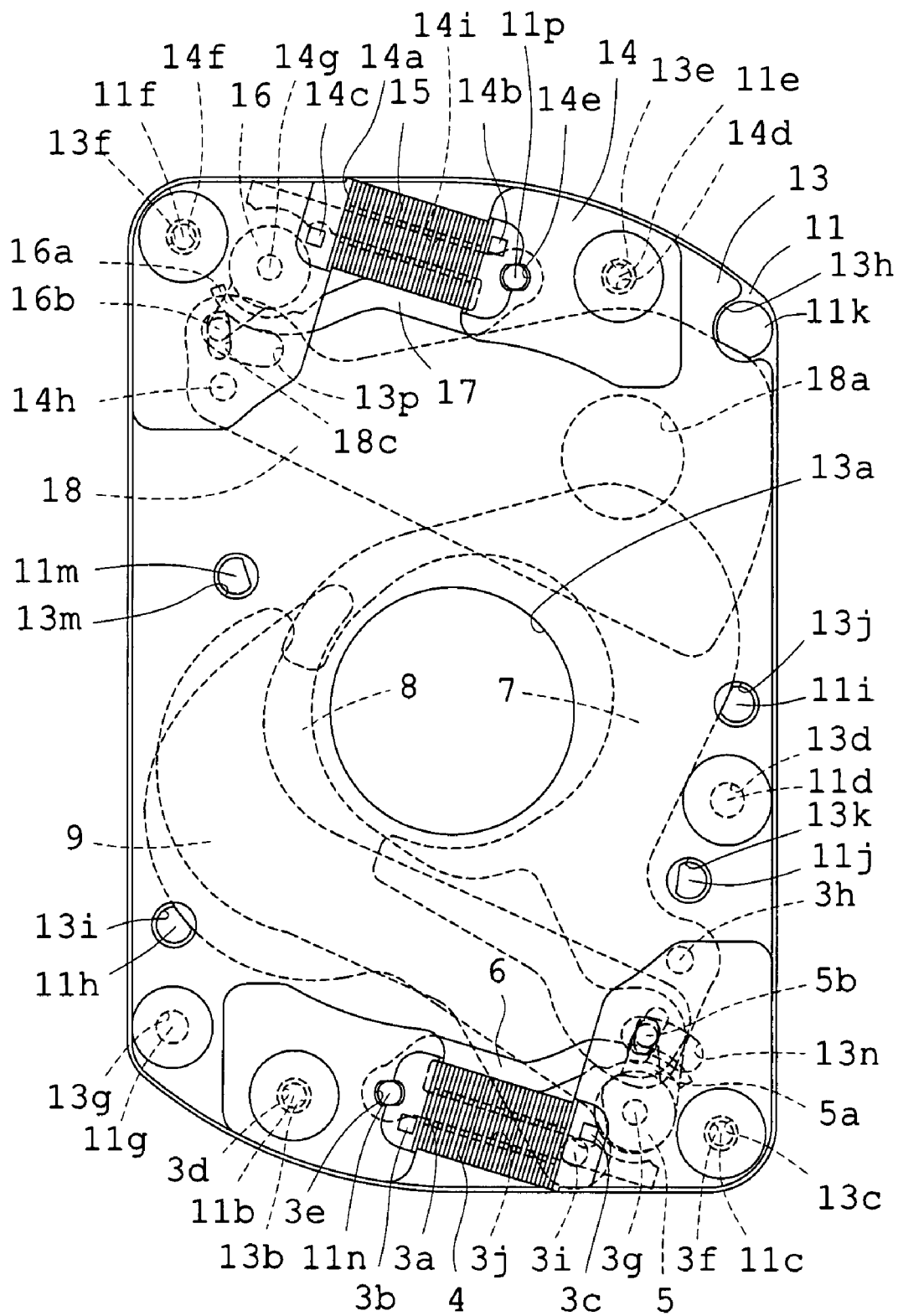
FIG. 7 is a plan view showing a state of Embodiment 2 brought about immediately before photography.
Figure 11:
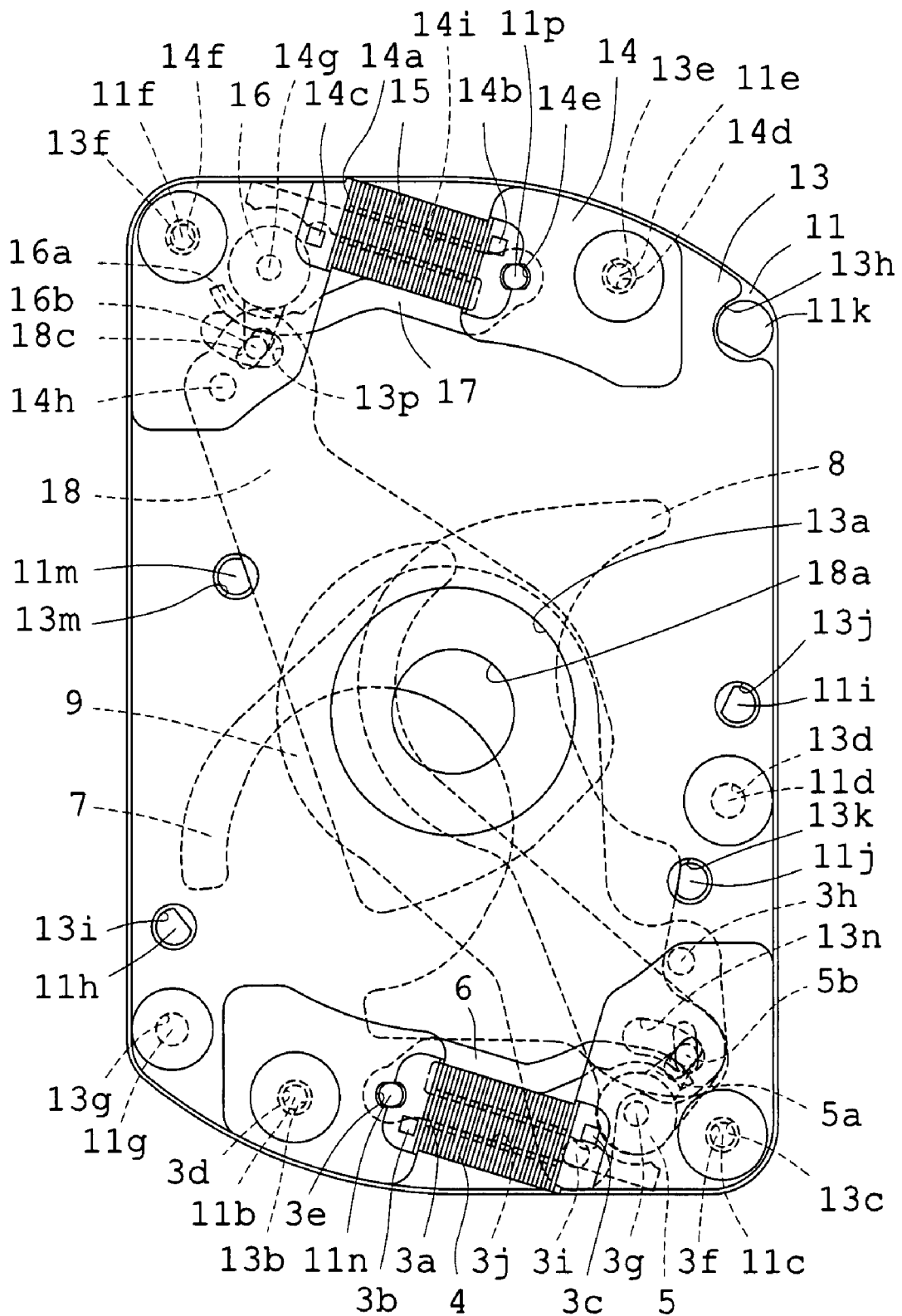
FIG. 11 is a plan view showing a state of Embodiment 2 brought about immediately after photography is completed.

As mentioned above, the shutter apparatus of the embodiment has substantially the same structure as that described in Embodiment 1. In each figure, like numerals are thus used for the actuator of the shutter apparatus and the three shutter blades with respect to Embodiment 1. In FIGS. 7 and 11, however, the reference numerals of the slots 7*a*, 8*a*, and 9*a* of the shutter blade 7, 8, and 9 are not indicated. In the embodiment, the three shutter blade 7, 8, and 9 are arranged in the blade chamber provided between the base plate 11 and the intermediate plate 12. The shape of the top of the shutter blade 8 is different from the case of Embodiment 1.

Subsequently, the structures of the stop blade and actuator of the stop apparatus will be explained. The structure of the actuator is exactly the same as that of the actuator of the shutter apparatus. Thus, the actuator is briefly explained. The actuator chamber is provided between the partition plate 13 and a cover frame 14. A coil 15 is wound around a bobbin 14*a* of the cover frame 14 so that both ends of the coil 15 are wound on pins 14*b* and 14*c*. Each of the mounting shanks 11*e* and 11*f* of the base plate 11, as seen from the mounting shank 11*e* shown in FIG. 10, includes two shank portions of different diameters, and small-diameter shank portions configured on their top sides are fitted into holes 14*d* and 14*f* of the cover frame 14. The positioning pin 11*p* is fitted into a hole 14*e* of the cover fame 14. On the partition-plate-13 side of the cover frame 14, two shanks 14*g* and 14*h* are set upright. Of these shanks, the shank 14*g*, as seen from FIG. 10, includes two shank portions of different diameters so that the top-side small-diameter shank portion passes through holes (each having no reference number) configured in the partition plate 13 and the intermediate plate 12 and its top is inserted in the hole 11*w* of the base plate 11. The shank 14*h* passes through holes (each having no reference number) provided in the partition plate 13 and the intermediate plate 12 and its top is inserted in the hole 11*v* of the base plate 11.

A permanent magnet rotor 16 is rotatably mounted to a large-diameter shank portion of the shank 14*g*. The permanent magnet rotor 16 is configured with an arm 16*a* and an output pin 16*b*, which is passes through the slot 13*p* of the partition plate 13 and a slot (no reference number) of the intermediate plate 12 so that its top is inserted in the slot 11*r* of the base plate 11. The cylindrical portion of the permanent magnet rotor 16 is radially magnetized to have two poles.

A yoke 17 shaped like the letter "U" is such that the tops of two legs are constructed as magnetic pole sections and are opposite to the peripheral surface of the permanent magnet rotor 16 and one of the legs is inserted in a hollow 14*i* provided at the center of the bobbin 14*a*. As shown in FIGS. 9A-9D, the yoke 17 is provided with a hole 17*a*, into which the positioning pin 11*p* is fitted.

In the blade chamber provided between the intermediate plate 12 and the partition plate 13, a stop blade 18 is placed. The stop blade 18 of the embodiment has an aperture section 18*a* smaller in diameter than the aperture section 13*a* and is rotatably mounted to the shank 14*h* of the cover frame 14. The stop blade 18 is provided with a slot 18*c*, in which the output pin 16*b* of the permanent magnet rotor 16 is inserted.

The assembly procedure of the blade driving apparatus of the embodiment constructed as described above is similar to that of the shutter apparatus of Embodiment 1. This assembly procedure will be explained below, chiefly using FIGS. 7 and 8A-8D. In FIG. 8A, the cover frames 3 and 14 on which the coils 4 and 15 are wound are shown. These two cover frames 3 and 14 are turned upside down and placed on a special jig, and other components are set in succession from the upper side (the lower side of FIG. 8A). The yokes 6 and 17 are first set so that one leg of the yoke 6 and one leg of the yoke 17 are inserted in hollows 3*j* and 14*j* of the bobbins 3*a* and 14*a*, respectively, and the holes 6*a* and 17*a* are made to coincide with the holes 3*e* and 14*e* of the cover frames 3 and 14, respectively. This situation is illustrated in FIG. 8B. Next, as shown in FIG. 8C, the permanent magnet rotors 5 and 16 are set to the shanks 3*g* and 14*g* of the cover frames 3 and 14, respectively. After that, as shown in FIG. 8D, five holes provided in the partition plate 13, each having no reference number, are set to the shanks 3*g*, 3*h*, and 3*i* of the cover frame 3 and the shanks 14*g* and 14*h* of the cover frame 14, and the slots 13*n* and 13*p* are set to the output pins 5*b* and 16*b* of the rotors 5 and 16.

Subsequently, as shown in FIG. 9A, a hole provided in the stop blade 18, having no reference number, is set to the shank 14*h* of the cover frame 14 and the slot 18*c* is set to the output pin 16*b* of the permanent magnet rotor 16. After that, as shown in FIG. 9B, five holes provided in the intermediate plate 12, each having no reference number, are set to the shanks 3*g*, 3*h*, and 3*i* of the cover frame 3 and the shanks 14*g* and 14*h* of the cover frame 14, and two slots, each having no reference number, are set to the output pins 5*b* and 16*b* of the permanent magnet rotors 5 and 16. Next, when holes provided in the three shutter blades 7, 8, and 9, each having no reference number, are set in turn to the shanks 3*h*, 3*g*, and 3*i*, and the slots 7*a*, 8*a*, and 9*a* are set to the output pin 5*b*, a situation shown in FIG. 9C is brought about.

After that, the base plate 11 is assembled and then the two cover frames 3 and 14 are mounted to the base plate 11. In the case where the base plate 11 is assembled, the large thickness portions 11*x* and 11*y* of the base plate 11 are fitted into holes, each having no reference number, of the intermediate plate 12 and the holes 13*q* and 13*r* configured in the partition plate 13; one positioning pin 11*n* is fitted into the hole 6*a* of the yoke 6 and the hole 3*e* of the cover frame 3; the other positioning pin 11*p* is fitted into the hole 17*a* of the yoke 17 and the hole 14*e* of the cover frame 14; and the stopper pins 11*h*, 11*i*, 11*j*, and 11*m* are fitted into four holes provided in the intermediate plate 12, each having no reference number, and the holes 13*i*, 13*j*, 13*k*, and 13*m*, respectively, of the partition plate 13. At the same time, the small-diameter shank portions configured on the top sides of the mounting shanks 11*b* and 11*c* are fitted into the holes 3*d* and 3*f* of one cover frame 3; the small-diameter shank portions configured on the top sides of the mounting shanks 11*e* and 11*f* are fitted into the holes 14*d* and 14*f* of the other cover frame 14; and the mounting shanks 11*d* and 11*g* are fitted into two holes provided in the intermediate plate 12, each having no reference number, and the holes 13*d* and 13*g* of the partition plate 13. This brings about a state where the tops of the shanks 3*g*, 3*h*, 3*i*, 14*g*, and 14*h* of the cover frames 3 and 14 are inserted in the holes 11*t*, 11*s*, 11*u*, 11*w*, and 11*v*, respectively, of the base plate 11, and the tops of the output pins 5*b* and 16*b* of the permanent magnet rotors 5 and 16 are inserted in the slots 11*q* and 11*r*, respectively, of the base plate 11.

In a state where the base palate 11 is assembled in this way, the tops of the mounting shanks 11*b*, 11*c*, 11*e*, and 11*f* pass through the holes 3*d*, 3*f*, 14*d*, and 14*f* of the cover frames 3 and 14 and protrude from them, and the tops of the mounting shanks 11*d* and 11*g* pass through the holes 13*d* and 13*g* of the partition plate 13 and protrude from them. Thus, finally, the tops of the 11*b*, 11*c*, 11*d*, 11*e*, 11*f*, and 11*g* are fused by heat and are deformed like flanges. Whereby, the two cover frames 3 and 14 are mounted to the base plate 11. FIG. 9D illustrates a state where the two cover frames 3 and 14 are mounted to the base plate 11 in this way. In FIG. 10 showing the enlarged view of FIG. 9D, the imaging module A, like FIG. 3C, housing the solid-state image sensor C and the photographic lens G is illustrated.

Subsequently, the operation of Embodiment 2 will be explained. In a state shown in FIG. 7, the power source of the camera is turned on, but the coils 4 and 15 of two actuators are not energized. In this case, a force for counterclockwise rotation is imparted to the permanent magnet rotor 5, while a force for clockwise rotation is imparted to the permanent magnet rotor 16. Consequently, the force for the clockwise rotation is imparted to the shutter blade 7 by a driving pin 5c, while the force for the counterclockwise rotation is imparted to the shutter blades 8 and 9, but the shutter blades 7 and 8 come in contact with the stoppers 11i and 11h, respectively, so that this state is maintained. The force for the counterclockwise rotation is imparted to the stop blade 18, but the stop blade 18 comes in contact with the stopper 11k so that this state is maintained. In this case, therefore, the aperture section 13a (the exposure aperture) is fully opened so that an image of an object can be observed by a liquid crystal display device.

When a release button of the camera is pushed in photography, light from the object is measured by a photometric device, and when the light from the object is relatively dark, only the shutter apparatus is operated in nearly the same way as in Embodiment 1. When the light from the object is relatively bright, the stop apparatus is first operated, followed by the shutter apparatus. In either case, the operation itself of the shutter apparatus is unchanged. In the operation described below, therefore, reference is made to only the latter case to avoid duplication.

First, to operate the stop blade 18, the electric current is supplied to the coil 15 in a reverse direction. Consequently, the permanent magnet rotor 16 is turned in the counterclockwise direction to rotate the stop blade 18 in the clockwise direction through the output pin 16b. The stop blade 18 thus penetrates to the aperture section 13a, but the stop blade 18 abuts on the stopper 11m and thereby the rotation of each of the permanent magnet rotor 16 and the stop blade 18 is stopped. Whereby, the amount of light of the solid-state image sensor C is controlled and decreased. Also, even when the stop blade 18 of the embodiment is constructed as the filter blade by covering the aperture section 18a with an ND filter sheet, it becomes possible to control the amount of light of the solid-state image sensor C as in the embodiment.

Next, in this state, electric charges stored in the solid-state image sensor are discharged. Whereby, exposure for photography is started and new electric charges are stored. When preset time controlled by an exposure time control circuit passes, the electric current is supplied to the coil 4 in the forward direction by its completion signal. Hence, the permanent magnet rotor 5 is turned in the clockwise direction to rotate the shutter blades 7, 8, and 9 through the output pin 5b. When the aperture section 18a of the stop blade 18 is closed, the shutter blade 8 abuts on the stopper 11j immediately after this, and thereby the rotation of each of the permanent magnet rotor 5 and the shutter blades 7, 8, and 9 is stopped. FIG. 11 illustrates this stopped state.

When the state of FIG. 11 is reached, imaging information stored in the solid-state image sensor is transferred to a memory device. When this transfer is completed, the electric current is supplied to the coil 4 in the reverse direction, while the electric current is supplied to the coil 15 in the forward direction. Consequently, on the one hand, the permanent magnet rotor 5 is turned in the counterclockwise direction to perform the opening operation of the shutter blades 7, 8, and 9. When the shutter blades 7, 8, and 9 fully open the aperture section 13a, the shutter blades 7 and 8 abuts on the stoppers 11i and 11h, respectively, immediately after this, and thereby the rotation of each of the permanent magnet rotor 5 and the shutter blades 7, 8, and 9 is stopped. On the other hand, when the electric current is supplied to the coil 4 in the forward direction, the permanent magnet rotor 16 is turned in the clockwise direction to rotate the stop blade 18 in the counterclockwise direction. When the stop blade 18 is completely removed from the aperture section 13a and abuts on the stopper 11k, the rotation of each of the permanent magnet rotor 16 and the stop blade 18 is stopped. After that, when the power to the coils 4 and 15 is disconnected, a state shown in FIG. 7 is brought about to await the next photography.

In the embodiment, the shutter apparatus and the stop apparatus are constructed as a single unit, and the shutter blades and the stop blade are arranged in separate blade chambers. However, the present invention is not limited to this structure. For example, Japanese Patent Kokai No. 2003-5251 sets forth a structure that the shutter blades and the stop blade are arranged in one blade chamber and another structure that the shutter blades and the filter blade are arranged in one blade chamber. The present invention may be constructed in this way or may be constructed so that the stop blade and the filter blade are arranged in one blade chamber. Further, Japanese Patent Kokai No. 2002-139765 describes a structure that two blade chambers between which the intermediate plate is interposed are provided so that the shutter blades are arranged in one blade chamber and the stop blade is placed in the other blade chamber, and another structure that the shutter blades are arranged in one blade chamber and the filter blade is placed in the other blade chamber. However, the present invention may be constructed in this way or may be constructed so that the stop blade is placed in one blade chamber and the filter blade is placed in the other blade chamber. Still further, Japanese Patent Kokai No. 2001-188275 sets forth the structure that two blade chambers between which the intermediate plate is interposed are provided so that the shutter blades are arranged in one blade chamber and the stop blade and the filter blade are arranged in the other blade chamber. However, the present invention may be designed in this way.

The blade driving apparatus for cameras in each of the above embodiments has been described on the premise that it is applied to the camera of the information terminal such as the mobile phone. However, the blade driving apparatus for cameras of the present invention has the structure suitable for the compact and slim design and thus can be used as the blade driving apparatus, for example, in an in-vehicle camera unit such as a rear-view camera for cars or a sensing camera used for a road lane recognition system or an automotive obstacle detection system. In the blade driving apparatus of the present invention, it is possible to control the amount of light of the solid-state image sensor and to image the light, and thus the application to the in-vehicle camera is advantageous.

What is claimed is:

1. A blade driving apparatus for a camera, comprising:
    a base plate having an aperture section for a photographing optical path;
    a partition plate having an aperture section for the photographing optical path configured such that an exposure aperture is restricted by at least one of the aperture section of the base plate and the partition plate, mounted to one surface of the base plate so that a blade chamber is defined between the base plate and the partition plate;

a cover frame at a side area of the exposure aperture, mounted to the base plate so that the partition plate is positioned between the base plate and the cover frame, having an actuator chamber between the partition plate and the cover frame;

a permanent magnet rotor positioned in the actuator chamber and rotatably mounted to a shank of the rotor arranged on the cover frame so that an output pin integrally rotated is introduced into the blade chamber;

a yoke shaped like a letter "U" in which tops of two legs constructed as magnetic pole sections are positioned opposite to a peripheral surface of the rotor in the actuator chamber and one of the two legs is fitted into a bobbin around which a coil is wound; and at least one blade placed in the blade chamber, rotatably mounted to a shank for at least one blade which is arranged on the cover frame so as to be introduced into the blade chamber, and configured so as to be introduced into, and removed from, the exposure aperture by the output pin.

2. A blade driving apparatus according to claim 1, wherein the shank to which the rotor is rotatably mounted is constructed so that a top thereof is introduced into the blade chamber, and is also used as a shank for the blade.

3. A blade driving apparatus according to claim 1 or 2, wherein the bobbin is molded integrally with the cover frame.

4. A blade driving apparatus according to claim 1 or 2, wherein the cover frame has a notch and a part of the bobbin and a part of the coil is within the notch.

5. A blade driving apparatus for a camera, comprising:
a base plate having an aperture section for a photographing optical path;
a partition plate having an aperture section for the photographing optical path configured such that an exposure aperture is restricted by at least one of aperture sections of the base plate and the partition plate, mounted to one surface of the base plate so that a blade chamber is interposed between the base plate and the partition plate;
first and second cover frames each at a side area of the exposure aperture, mounted to the base plate so that the partition plate is between the base plate and the cover frame, having first and second actuator chambers between the partition plate and the cover frames;
first and second permanent magnet rotors in the first and second actuator chambers, respectively and rotatably mounted to respective shanks for rotors which are on the first and second cover frames, respectively, so that output pins, each integrally rotated, are introduced into the blade chamber;
first and second yokes each shaped like a letter "U" in which tops of two legs of each yoke constructed as magnetic pole sections are opposite to a peripheral surface of each of the first and second permanent magnet rotors and one of the two legs of each yoke is fitted into a bobbin around which a coil is wound;
first and second shanks for blades set upright on the first and second cover frames, at least one for each of the cover frames; and
first and second blades, rotatably mounted to respective first and second shanks for the blades, in the blade chamber and configured and arranged so as to be introduced into, and removed from, the exposure aperture by individual output pins of the first and second permanent magnet rotors.

6. A blade driving apparatus according to claim 5, wherein at least one of the shanks to which the first and second permanent magnet rotors are rotatably mounted is constructed so that a top thereof is introduced into the blade chamber, and is also used as one of shanks for the first and second blades.

7. A blade driving apparatus according to claim 5 or 6, wherein at least one of the first and second bobbins is molded integrally with the cover frame.

8. A blade driving apparatus according to claim 5 or 6, wherein at least one of the first and second cover frames has a notch and a part of one of the first and second bobbins and a part of the coil wound around the one bobbin are in the notch.

9. A blade driving apparatus according to claim 1 or 5, wherein structures of the blade driving apparatus are arranged to control an amount of light reaching a solid-state image sensor.

10. An information terminal provided with a blade driving apparatus for a camera, the blade driving apparatus comprising:
a base plate having an aperture section for a photographing optical path;
a partition plate having an aperture section for the photographing optical path configured such that an exposure aperture is restricted by at least one of aperture sections of the base plate and the partition plate, mounted to one surface of the base plate so that a blade chamber is interposed between the base plate and the partition plate;
a cover frame mounted to the base plate so that the partition plate is interposed between the base plate and the cover frame, an actuator chamber being defined between the partition plate and the cover frame;
a permanent magnet rotor placed in the actuator chamber and rotatably mounted to a shank for the rotor such that an output pin integrally rotated is introduced into the blade chamber;
a yoke shaped like a letter "U" in which tops of two legs constructed as magnetic pole sections are opposite to a peripheral surface of the rotor in the actuator chamber and one of the two legs is fitted into a bobbin around which a coil is wound; and
at least one blade placed in the blade chamber, rotatably mounted to a shank for at least one blade which is arranged on the cover frame and is introduced into the blade chamber, and introduced into, and removed from, the exposure aperture by the output pin,
elements of the blade driving apparatus being arranged to control an amount of light reaching a solid-state image sensor.

11. An information terminal provided with a blade driving apparatus for a camera, the blade driving apparatus comprising:
a base plate having an aperture section for a photographing optical path;
a partition plate having an aperture section for the photographing optical path configured such that an exposure aperture is restricted by at least one of aperture sections of the base plate and the partition plate, mounted to one surface of the base plate so that a blade chamber is interposed between the base plate and the partition plate;
first and second cover frames, each mounted to the base plate so that the partition plate is interposed between the base plate and the cover frame, having first and second actuator chambers between the partition plate and the cover frames;
first and second permanent magnet rotors separately placed in the first and second actuator chambers and rotatably mounted to shanks for rotors which are positioned with respect to the first and second cover frames, respectively, so that output pins, each integrally rotated, are introduced into the blade chamber;

first and second yokes each shaped like a letter "U" in which tops of two legs of each yoke constructed as magnetic pole sections are opposite to a peripheral surface of each of the first and second permanent magnet rotors and one of the two legs of each yoke is fitted into a bobbin around which a coil is wound;

first and second shanks for blades set upright on the first and second cover frames, at least one for each of the cover frames; and first and second blades, each including at least one, rotatably mounted to the first and second shanks for the blades, respectively, in the blade chamber and introduced into, and removed from, the exposure aperture by individual output pins of the first and second permanent magnet rotors, elements of the blade driving apparatus being arranged to control an amount of light reaching a solid-state image sensor.

12. An in-vehicle camera provided with a blade driving apparatus for a camera, the blade driving apparatus comprising:

a base plate having an aperture section for a photographing optical path;

a partition plate having an aperture section for the photographing optical path configured such that an exposure aperture is restricted by at least one of aperture sections of the base plate and the partition plate, mounted to one surface of the base plate so that a blade chamber is interposed between the base plate and the partition plate;

a cover frame existing at a side area of the exposure aperture, mounted to the base plate so that the partition plate is interposed between the base plate and the cover frame, having an actuator chamber between the partition plate and the cover frame;

a permanent magnet rotor placed in the actuator chamber and rotatably mounted to a shank for the rotor, the rotor being arranged so that an output pin integrally rotated is introduced into the blade chamber;

a yoke shaped like a letter "U" in which tops of two legs constructed as magnetic pole sections are opposite to a peripheral surface of the rotor in the actuator chamber and one of the two legs is fitted into a bobbin around which a coil is wound; and at least one blade placed in the blade chamber, rotatably mounted to a shank for at least one blade which is set upright on the cover frame and is introduced into the blade chamber, and introduced into, and removed from, the exposure aperture by the output pin, the blade driving apparatus being capable of controlling an amount of light of a solid-state image sensor.

13. An in-vehicle camera provided with a blade driving apparatus for a camera, the blade driving apparatus comprising:

a base plate having an aperture section for a photographing optical path;

a partition plate having an aperture section for the photographing optical path configured such that an exposure aperture is restricted by at least one of aperture sections of the base plate and the partition plate, mounted to one surface of the base plate so that a blade chamber is interposed between the base plate and the partition plate;

first and second cover frames each existing at the side area of the exposure aperture, mounted to the base plate so that the partition plate is interposed between the base plate and the cover frame, having first and second actuator chambers between the partition plate and the cover frames;

first and second permanent magnet rotors separately placed in the first and second actuator chambers and rotatably mounted to shanks for rotors which are set arranged with respect to the first and second cover frames, respectively, so that output pins, each integrally rotated, are introduced into the blade chamber;

first and second yokes each shaped like a letter "U" in which tops of two legs of each yoke constructed as magnetic pole sections are opposite to a peripheral surface of each of the first and second permanent magnet rotors and one of the two legs of each yoke is fitted into a bobbin around which a coil is wound;

first and second shanks for blades set upright on the first and second cover frames, at least one for each of the cover frames; and first and second blades, each including at least one, rotatably mounted to the first and second shanks for the blades, respectively, in the blade chamber and introduced into, and removed from, the exposure aperture by individual output pins of the first and second permanent magnet rotors, the blade driving apparatus being capable of controlling an amount of light of a solid-state image sensor.

* * * * *